United States Patent
Hong et al.

US005721066A

[11] Patent Number: 5,721,066
[45] Date of Patent: Feb. 24, 1998

[54] BATTERY USING LIGHT WEIGHT ELECTRODES

[76] Inventors: Kuochih Hong, 1790 Rollingwoods, Troy, Mich. 48098; Kuoshiu Hong, 10F. No. 8, Li-Nung Street, Sec 1; Huiyim Hong, 4F. No. 9, 32 Nung, Alley 189, Cheng-Tai Road, Sec. 1 Wu-Ku Hsiang, both of Taipei, Taiwan

[21] Appl. No.: 744,051

[22] Filed: Nov. 7, 1996

[51] Int. Cl.⁶ .............................. H01M 4/66; H01M 4/38
[52] U.S. Cl. .............................. 429/59; 429/223; 429/245
[58] Field of Search .............................. 429/245, 223, 429/59

[56] References Cited

U.S. PATENT DOCUMENTS

| | | |
|---|---|---|
| 4,849,205 | 7/1989 | Hong . |
| 4,915,898 | 4/1990 | Wolff et al. . |
| 4,946,646 | 8/1990 | Gamo et al. . |
| 5,006,328 | 4/1991 | Hong . |
| 5,536,601 | 7/1996 | Koksbang et al. ............ 429/245 |
| 5,541,017 | 7/1996 | Hong et al. . |
| 5,547,782 | 8/1996 | Dasgupta et al. ............ 429/245 X |
| 5,556,719 | 9/1996 | Hong et al. . |
| 5,578,399 | 11/1996 | Olsen ............ 429/245 |

*Primary Examiner*—John S. Maples

[57] ABSTRACT

This invention discloses a method to make a light-weight and flexible electrode for electrochemical application especially for nickel hydride batteries. The method uses a conductive polymer as the substrate of an electrode. The conductive polymer can be an acidic or a basic type polymer. In the preparation of an electrode, the monomers of the conductive polymer can be used as the starting material. The electrode of this invention has about 20% more capacity than the electrode using nickel metal substrate.

12 Claims, No Drawings

BATTERY USING LIGHT WEIGHT ELECTRODES

BACKGROUND OF THE INVENTION

1. Field of the invention

This invention relates to light weight electrodes and a battery using same. More particularly, this invention relates to the rechargeable battery, especially a metal oxide-hydride battery using a novel light weight substrate current collector in the anode and/or cathode electrodes.

2. Description of Prior Art

The market size of batteries especially rechargeable batteries such as nickel hydride batteries is increasing with the expansion of electronic products in this Information Age. The direction of the electronic products is totowards the reduction of the size and the weight of the products. Accordingly, it is very important for batteries to move in the same direction. This is one of the reasons that nickel hydride batteries are begining to replace the nickel cadmium batteries. The energy density of a hydride battery is much higher than that of a cadmium battery.

At present, the substrate current collector used in a nickel positive electrode, cadmium or hydride negative electrode is made of nickel or nickel-plated steel in the form of mesh, fiber, sponge, expanded or perforated foil. Depending on the type of the battery made, the weight and/or the volume of the metal-type substrate is about 20 to 30 wt. % of the electrode. This is one of the liming factors in the development of battery technology. It would be better to have a lighter material to replace the metal used in the substrate current collector, thus reducing the weight and/or volume of the electrode. Types of substrate such us carbon fiber and nickel-coated plastic mesh have been mentioned in some articles. However, carbon fiber is not strong, and is also expensive. A nickel-coated plastic mesh is not easy to coat and of high cost as well.

To solve the weight and the thickness problems, this invention provides a method to make a thin and light weight electrode, especially a light-weight nickel positive electrode and/or a light-weight hydride negative electrode using a novel substrate current collector, and to make a battery using same.

SUMMARY OF THE INVENTION

This invention discloses a method to make a thin and light weight electrode using a novel conductive polymer as the substrate current collector. The method includes the following steps:

1. Provide the active material of an electrode.
2. Dissolve a conductive polymer in a solvent to make a solution of suitable viscosity.
3. Mix the active material of the electrode with the conductive polymer solution to make a slurry.
4. Let the slurry solidify at an ambient or a mild warm temperature to form a positive or a negative electrode using the conductive polymer as the substrate current collector.

Alternatively, the monomers of the conductive polymer can be used to replace the conductive polymer as the staffing raw material. In this ease, a catalyst such as an oxidant generally is added to speed up the polymerization.

Thus a rechargeable battery such as a metal oxide-hydride battery, especially, a rechargeable sealed nickel-hydride battery using thin and light weight electrodes can be made. The battery, according to this invention, is composed of a container, thin and light weight positive and negative electrodes, a separator positioned between the positive and negative electrodes, and an electrolyte in the container and in contact with the positive and negative electrodes and the separator. In the ease of a rechargeable nickel-hydride battery, the negative electrode is a hydrogen storage electrode comprising at least one hydrogen storage material (alloy) and/or its hydride.

The advantages, features and other objects of the present invention will become clear in the following detailed description.

DETAILED DESCRIPTION OF THE INVENTION

The purpose of this invention is to provide a method to make a thin and light weight electrode using a novel conductive polymer as the substrate current collector, and therefore make a high capacity battery especially a rechargeable hydride battery using same. The advantages of this novel method are:

1. The heavy and bulky metal substrate is eliminated and replaced by a very light-weight and low-volume conductive polymer.
2. The preparation process is simple.
3. The electrode made can be thin like paper.
4. The electrode made is very flexible and durable.
5. The electrode made has a very high energy density.

The method of this invention uses a conductive polymer as the substrate current collector of an electrode. The polymer itself is a conductor, as opposed to a plastic fiber coated with a layer of nickel metal. Furthermore, it is not necessary to make the conductive polymer in a fibrous form before using.

The method includes the following steps:

1. Provide the active material of an electrode.
2. Dissolve a conductive polymer in a solvent to make a solution of suitable viscosity.
3. Mix the active material of the electrode with the conductive polymer solution to make a slurry.
4. Let the slurry solidify at an ambient or mild warm temperature to form a positive or negative electrode using the conductive polymer as the substrate current collector.

The size, thickness, and the shape of the electrode made can be controlled with various methods like fabric or paper.

Alternatively, the monomers of the conductive polymer can be used to replace the conductive polymer as the staring raw material. In this case, a catalyst such as an oxidant generally is added to speed up the polymerization. The use of monomers as the starting raw material has some advantages. The monomers are much easier to dissolve in the solvent and to mix with the active material to make a homogeneous slurry. In the presence of a catalyst such as an oxidant, the monomers will polymerize to form the conductive polymer in the solvent. During the solidification the conductive polymer then binds the active material homogeneously to form the electrode.

In this invention, one or more conductive polymers can be used as the substrate current collector. Also, the conductive polymer can be a basic or an acidic type. The basic type conductive polymer is suitable for a battery which uses an alkaline solution as the electrolyte such as a nickel hydride battery. The acidic type conductive polymer is useful for an acidic battery such as a lead acid battery.

In an alkaline battery such as a nickel cadmium battery or a nickel hydride battery, the conductive polymer is a basic type polymer such as polythiophene, polyorthotoluidine, polyoctylthiophene. In making an electrode using a conductive polymer as the substrate, a conductive polymer can be dissolved in a solvent such as toluene to make a solution of suitable viscosity. Then a suitable mount of the active material of the positive or negative electrode is added to the solution to make a slurry. Alternatively, a suitable amount of the monomers of a conductive polymer such as thiophene, 3-n-octylthiophene, plus an oxidant such as ferric chloride, nitromethane, nitrobenzene, is mixed with a solvent such as toluene to form a homogeneous solution. A suitable amount of the active material for the positive or negative electrode is added to the solution to make a slurry. With the help of the oxidant, the monomers in the solvent will polymerize to form the conductive polymer. The conductive polymer itself serves as a substrate current collector as well us a binder to the active material. At an ambient temperature, the solvent will evaporate and the slurry will solidify to form an electrode. A slightly warm temperature up to 120° C. will speed up the solidification process. In this invention, the conductive polymer is the substrate. Therefore, the pasting of the active material onto other substrate is not needed. Consequently, the weight and the thickness of the electrode in this invention is lighter than the electrode using the metal substrate. The electrode made is very flexible and can be very thin like a paper. Thus, the electrode of this invention has a very high energy density.

It is noted that the conductive polymer can replace wholly or partially the typical binder such as PTFE, CMC, PVA (polyvinyl alcohol), polyox, methylcellulose and hydroxylmethyl cellulose to enhance the binding and conductivity of the current sintered or pasted electrode. Also, the conductive polymer can be coated on a hydride or nickel electrode to improve the performance of the battery.

Thus a rechargeable battery such as an oxide-hydride battery, and in particular, a rechargeable sealed nickel-hydride battery using the thin and light weight electrodes of this invention can be made. The battery, according to this invention, is composed of a container, thin and light weight positive and negative electrodes, a separator positioned between the positive and negative electrodes, and an electrolyte in the container and in contact with the positive and negative electrodes and the separator. In the case of a rechargeable nickel-hydride battery, the negative electrode is a hydrogen storage electrode comprising at least one or more multicomponent hydrogen storage material (alloy) and/or its hydride chosen from the group of $AB_5$-, $AB_2$-, $AB_x$-type alloys and combinations thereof. Some of the $AB_x$-type multicomponent alloys are disclosed by Hong in U.S. Pat. Nos. 4,849,205, 5,006,328, 5,501,917, 5,541,017, 5,552,246, and 5,556,719. The positive electrode active material comprises at least a metal oxide, preferably a nickel oxide plus 1–15 wt. % cobalt oxide. To ensure high efficiency, 0.5–15 wt. % of fine powder selected from the group consisting of Ni, Cu, Zn, C, Mg, Al, Mn, iodine, iodide (LiI, NaI, KI, etc.), hydride, and combinations thereof, is added during the preparation of a nickel positive electrode.

EXAMPLE 1

According to the method of this invention, a hydride electrode using a hydrogen storage alloy having a composition: $Ti_{8.97}Zr_{21.94}Cr_{2.50}Mn_{8.48}V_{23.95}Ni_{33.92}Si_{0.15}$ as the active material and a conductive polymer: polyoctylthiophene as the substrate current collector is made. The capacity of this electrode including the substrate is up to 347 mAH/g of electrode. For comparison, a similar electrode using a nickel mesh as the substrate current collector is made. The capacity is 287 mAH/g of electrode. Clearly, the electrode using the conductive polymer polyoctylthiophene as the substrate has about 20% more capacity than the one using nickel mesh as the substrate.

EXAMPLE 2

According to the method of this invention, a hydride electrode using a hydrogen storage alloy having a composition: $Ti_{21.25}Zr_{18.01}Cr_{2.53}Mn_{9.34}V_{7.95}Ni_{40.92}$ as the active material and a conductive polymer: polyoctylthiophene as the substrate current collector is made. However, the starting raw material is the 3-octythiophene monomer, toluene the solvent and ferric chloride the oxidant. The capacity of this electrode made is up to 335 mAH/g of electrode. For comparison, a similar sintered electrode using a nickel mesh as the substrate current collector is made. The capacity is 272 mAH/g of electrode. Clearly, the electrode using the conductive polymer polyoctylthiophene as the substrate has about 23% more capacity than the one using nickel mesh as the substrate.

What is claimed is:

1. A nickel hydride battery, wherein said battery comprises a positive electrode, a negative electrode, a separator between the positive and negative electrodes, and an electrolyte in a container and in contact with the positive and negative electrodes and seperators; and wherein at least the negative electrode comprise a conductive polymer as a substrate current collector; wherein said negative electrode is a hydrogen storage electrode; and said positive electrode is a nickel oxide electrode.

2. The battery of claim 1, wherein said conductive polymer is a basic type polymer.

3. The battery of claim 1, wherein said conductive polymer is an acidic type polymer.

4. The battery of claim 1, wherein said conductive polymer is selected from the group consisting of polythiophene; polyorthotoluidine, and polyoctylthiophene.

5. The battery of claim 4, wherein said conductive polymer is polyoctylthiophene.

6. The battery of claim 1, wherein said conductive polymer is prepared from monomers of said conductive polymer.

7. The battery of claim 1, wherein said negative electrode comprises one or more multicomponent alloys.

8. The battery of claim 7, wherein said multicomponent alloy(s) is(are) chosen from the group consisting of $AB_5$-, $AB_2$-, $AB_x$-type alloys and combination thereof.

9. The battery of claim 1, wherein said negative electrode comprises a conductive polymer as a binder.

10. The battery of claim 1, wherein said positive electrode comprises a conductive polymer as a binder.

11. The battery of claim 9, wherein said negative electrode comprises one or more multicomponent alloys.

12. The battery of claim 11, wherein said multicomponent alloy(s) is(are)chosen from the group consisting of $AB_5$-, $AB_2$-, $AB_x$-type alloys and combinations thereof.

* * * * *